US008009860B2

(12) United States Patent
Ishii (10) Patent No.: US 8,009,860 B2
(45) Date of Patent: Aug. 30, 2011

(54) IMAGE PROCESSING APPARATUS, METHOD, PROGRAM AND RECORDING MEDIUM FOR EXTRACTING EMBEDDED INFORMATION

(75) Inventor: Masaki Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 939 days.

(21) Appl. No.: 11/602,257

(22) Filed: Nov. 21, 2006

(65) Prior Publication Data

US 2007/0206229 A1    Sep. 6, 2007

(30) Foreign Application Priority Data

Nov. 22, 2005  (JP) ................................. 2005-336873
Jun. 16, 2006  (JP) ................................. 2006-167993

(51) Int. Cl.
    G06K 9/00   (2006.01)
    G06K 9/46   (2006.01)
    G06K 7/10   (2006.01)
(52) U.S. Cl. .......................... 382/100; 382/190; 382/321
(58) Field of Classification Search .................... 382/100
    See application file for complete search history.

(56) References Cited

U.S. PATENT DOCUMENTS

| 6,216,228 B1 * | 4/2001 | Chapman et al. | 713/176 |
| 6,243,480 B1 * | 6/2001 | Zhao et al. | 382/100 |
| 6,421,070 B1 * | 7/2002 | Ramos et al. | 715/763 |
| 6,650,256 B2 * | 11/2003 | Kondo et al. | 341/50 |
| 6,917,724 B2 * | 7/2005 | Seder et al. | 382/321 |
| 2003/0095691 A1 * | 5/2003 | Nobuhara et al. | 382/124 |
| 2004/0161108 A1 * | 8/2004 | Ando et al. | 380/201 |
| 2004/0193742 A1 * | 9/2004 | Ikeda | 710/1 |
| 2005/0141004 A1 | 6/2005 | Kiwada | |
| 2005/0225792 A1 | 10/2005 | Morita | |
| 2005/0276439 A1 | 12/2005 | Ishii | |

FOREIGN PATENT DOCUMENTS

| JP | 2833975 | 10/1998 |
| JP | 3181866 | 4/2001 |
| JP | 2003-187290 | 7/2003 |
| JP | 2003-283797 | 10/2003 |
| JP | 2004-021554 A | 1/2004 |
| JP | 2004-80136 | 3/2004 |
| JP | 3628312 | 12/2004 |
| JP | 2005-94215 A | 4/2005 |
| JP | 2005-197834 A | 7/2005 |
| JP | 3711928 | 8/2005 |
| JP | 2005-316053 A | 11/2005 |

OTHER PUBLICATIONS

Office Action dated Jan. 18, 2011 issued in corresponding Japanese Application No. JP 2006-167993.

* cited by examiner

*Primary Examiner* — David P Zarka
(74) *Attorney, Agent, or Firm* — Dickstein Shapiro LLP (57) ABSTRACT

An image processing apparatus for extracting embedded information that is embedded in an image is provided. The image processing apparatus includes: an information extraction unit configured to extract the embedded information from the image; an executable function determination unit configured to determine one or more executable functions according to the embedded information that is extracted; a display unit configured to display a list of the one or more executable functions determined by the executable function determination unit.

17 Claims, 11 Drawing Sheets

| EXTRACTION INFORMATION | | EXECUTABLE FUNCTION | | | | |
|---|---|---|---|---|---|---|
| | | CHECK OF SOURCE INFORMATION | ACCESS TO RELATED HP | MAIL SENDING | FAX SENDING | FOLDER DISTRIBUTION |
| | AUTHOR ID | ○ | | | | |
| | GENERATION DATE AND TIME | ○ | | | | |
| | LINK TO ORIGINAL | | | | | |
| | URL | | ○ | | | |
| | MAIL ADDRESS | | | ○ | | |
| | FAX NUMBER | | | | ○ | |
| | STORING LOCATION | | | | | ○ |

IMAGE PROCESSING APPARATUS, METHOD, PROGRAM AND RECORDING MEDIUM FOR EXTRACTING EMBEDDED INFORMATION

BACKGROUND OF THE INVENTION

1. Field of the Invention

The present invention relates to an image processing apparatus, an image processing method, an image processing program, and a computer readable medium. More particularly, the present invention relates to an image processing apparatus, an image processing method, an image processing program, and a computer readable medium for extracting information embedded in an image.

2. Description of the Related Art

In recent years, techniques have been developed for embedding some kind of additional information other than originally written information in printed material that is a kind of a recording medium so as to add value to the printed material. Barcode is one of the technique well known from the past. However, as to the barcode, it is necessary to keep an area for embedding the barcode on a paper for embedding additional information. In addition, when the barcode is embedded as security information such as restriction information for preventing illegal copy, there is a problem in that the barcode and original printed information are separated.

For solving such problems, a technique has been proposed for arranging inconspicuous patterns on a background of the printed material.

For example, Japanese Patent No. 3181866 discloses a recording medium on which dot code that is optically readable is embedded as multimedia information, and discloses a system for reading the dot code so as to reproduce and output the original multimedia information.

Japanese Patent No. 3628312 discloses a method for adding secret information to a document image in a form other than characters, and discloses a method for detecting secret information from a printed document.

Japanese Laid-Open Patent Application No. 2003-187290 discloses an apparatus for extracting and processing information embedded in a valuable paper that is stuck to a distributed object.

In addition, Japanese Laid-Open Patent Application No. 2003-283797 discloses a method for embedding information using dot patterns for embedding copy right information into printer matter without deteriorating image quality.

However, in the above-mentioned techniques, since information is embedded as a form that is indiscernible for human eyes. Therefore, if such techniques are applied to various purposes, it is very difficult for a user to identify what information is embedded in the image (printed material) and to identify what is the use only by viewing the image (printed material).

SUMMARY OF THE INVENTION

An object of the present invention is to provide techniques for a user to be able to easily identify executable functions based on information embedded in an image.

The object is achieved by an image processing apparatus for extracting embedded information that is embedded in an image, comprising:

an information extraction unit configured to extract the embedded information from the image;

an executable function determination unit configured to determine one or more executable functions according to the embedded information that is extracted;

a display unit configured to display a list of the one or more executable functions determined by the executable function determination unit.

The present invention can be also configured as an image processing method used in the image processing apparatus, an image processing program for causing a computer to function as the image processing apparatus, and a computer readable recording medium storing the image processing program.

According to the present invention, techniques for a user to be able to easily identify executable functions based on embedded information can be provided.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention are described with reference to figures. In a first embodiment, an example is described in which an image processing apparatus is configured by using an information processing apparatus such as a PC. That is, an example is explained in which the information processing apparatus such as a PC extracts embedded information from a document image in which the embedded information is embedded as digital watermark.

Figure 1:
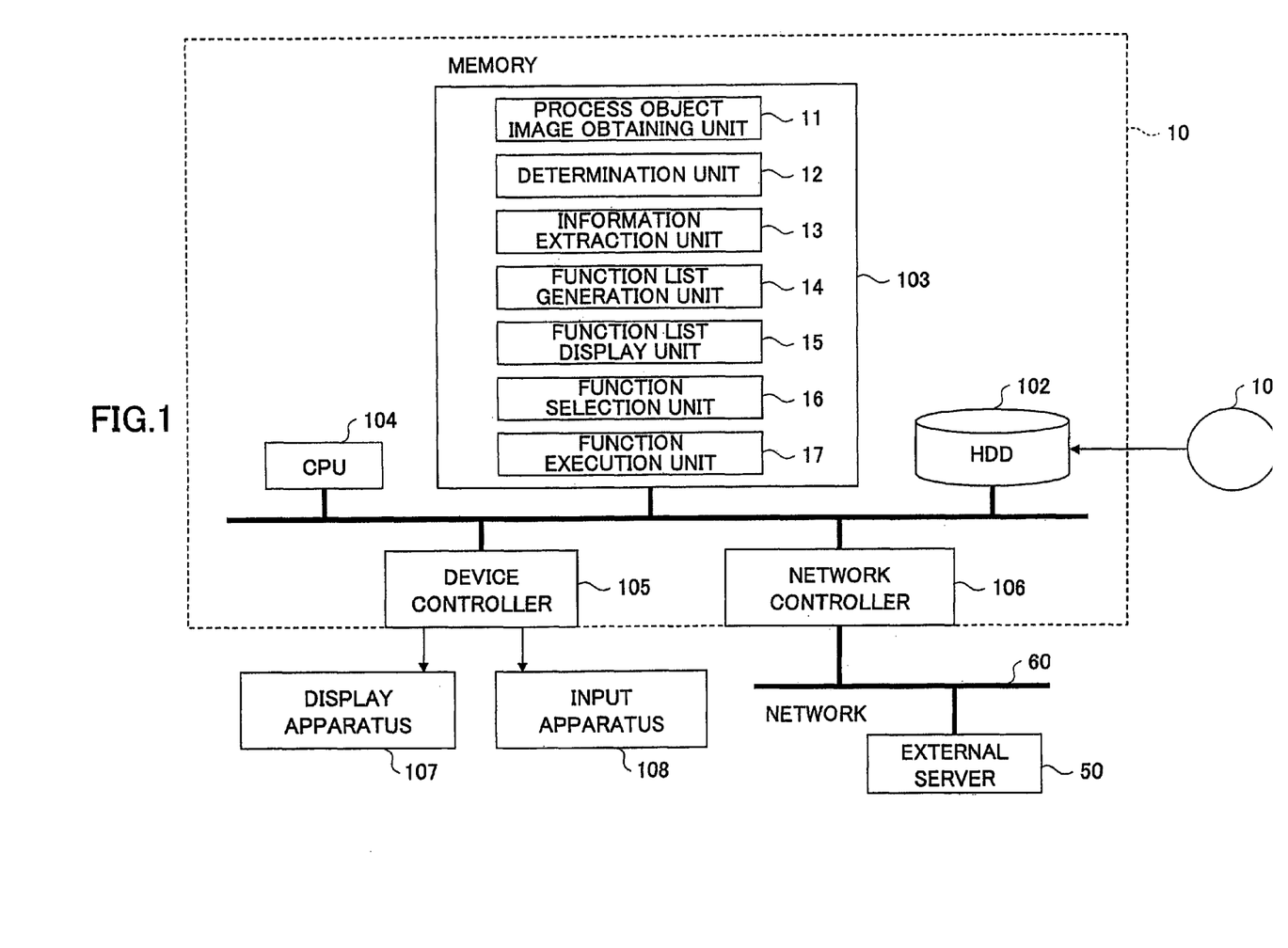
FIG. 1 shows a configuration example of an information processing apparatus in a first embodiment.

FIG. 1 shows a configuration example of an information processing apparatus in the first embodiment. The information processing apparatus shown in FIG. 1 includes a HDD (Hard Disk Drive) 102, a memory 103, a central processing unit 104, a device controller 105 and a network controller 106 which are connected to each other.

A program for realizing functions of the information processing apparatus 10 is provided by a recording medium such as a CD-ROM. The program recorded in the recording medium 101 is stored in the HDD 102 by installing the program. The HDD 102 stores the installed program and stores various data (image data and the like) necessary for processing by the program.

When the program is instructed to launch, the program is read from the HDD 102 and is stored in the memory 103. The central processing unit 104 executes functions of the information processing apparatus 10 according to the program in the memory 103. The device controller 105 controls external devices such as the display apparatus 107 and the input apparatus 108 and the like. The network controller 106 controls network communications.

The display apparatus 107 displays information. The input apparatus 108 includes a keyboard and a mouse, and is used for inputting various operation instructions.

The information processing apparatus 10 may be connected to another computer (external server 50) via a network (that may include a cable network or a wireless network) such as a LAN (Local Area Network) or the Internet.

By the way, functions realized by the program include a process object image obtaining unit 11, a determination unit 12, an information extraction unit 13, a function list generation unit 14, a function list display unit 15, a function selection unit 16 and a function execution unit 17 and the like. Functions of each unit is described later. Since the functions are realized in the information processing apparatus by the program, the functions are written in the memory 103 that stores the program for the sake of convenience in FIG. 1.

Figure 2:
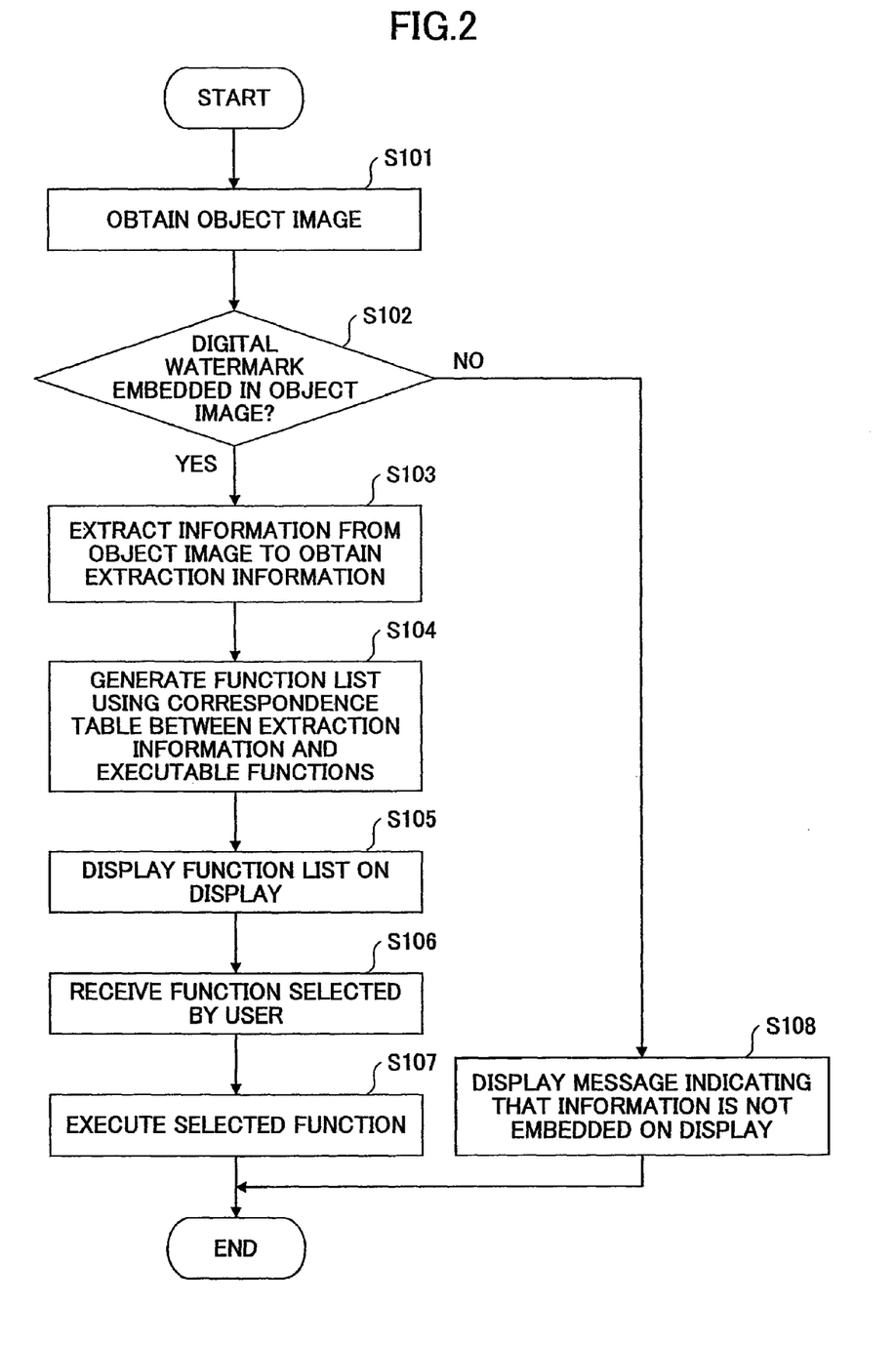
FIG. 2 shows a flowchart for explaining a process procedure of the information processing apparatus in the first embodiment.

In the following, a process procedure of the information processing apparatus 10 of FIG. 1 is described in the following. FIG. 2 is a flowchart for explaining the process procedure of the information processing apparatus 10 in the first embodiment.

Figure 3:
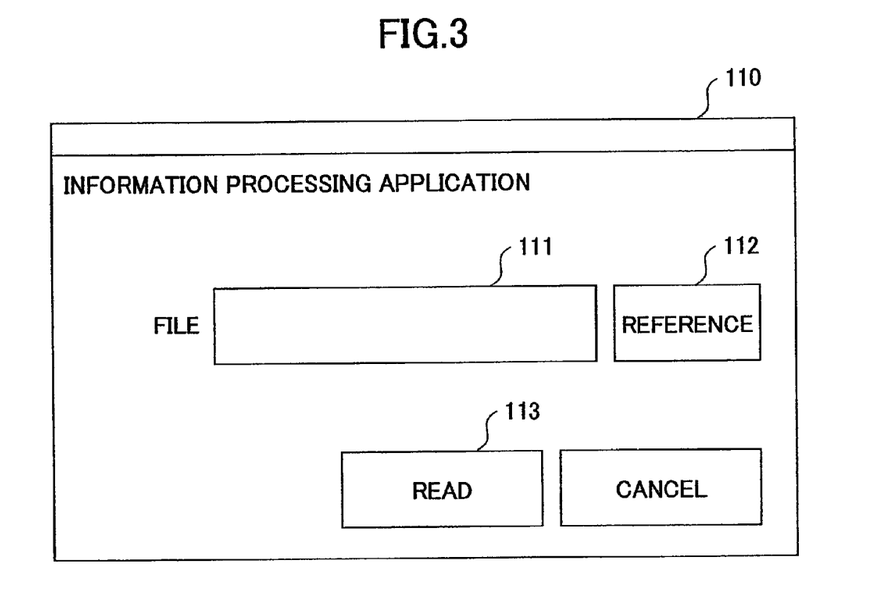
FIG. 3 shows a display example of a file dialog.

In step S101, the process object image obtaining unit 11 causes the display apparatus 107 to display a file dialog shown in FIG. 3, for example.

FIG. 3 shows a display example of the file dialog. The file dialog 110 shown in FIG. 3 is similar to one generally used. That is, the user may enter a file name in a text box 111 directly, or the user may select a file name from a folder list displayed by clicking a reference button 112.

When a read button 113 is clicked, the process object image obtaining unit 11 obtains an image stored in a file selected by the user on the file dialog 110 as an image of a process object (to be referred to as "object image" hereinafter), and stores the image into the memory 103. By the way, the destination from which the file is obtained is not limited to the HDD 102 in the information processing apparatus 10, and it may be an external HDD, a portable HDD, or an external server 50 or the like.

In this embodiment, a case is described in which a document image in which information is embedded by digital watermarking is selected as the object image.

Figure 4:
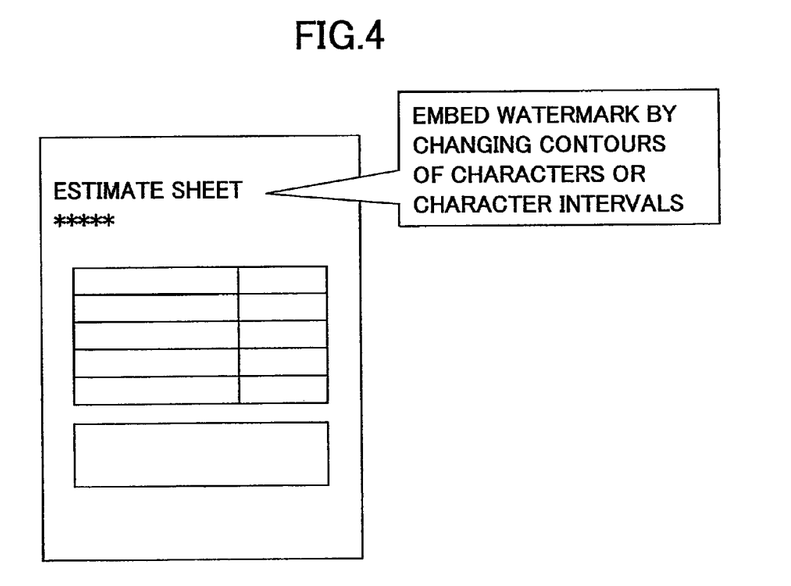
FIG. 4 shows an example of an object image in the first embodiment.

FIG. 4 shows an example of the document image as the object image in the first embodiment. The document image shown in FIG. 4 includes at least characters or character strings. Information is embedded by changing a contour of the characters or changing character intervals, for example. The embedded information may include any one or any combination of an author ID of the object image, generation date and time of the object image, link information to original data (file) of the object image, URL to a predetermined Web page, a mail address, FAX number, a storing location of the object image and the like.

Figure 5:
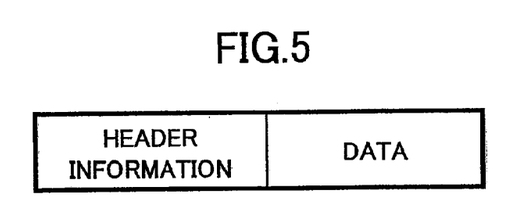
FIG. 5 shows an example of a format of the embedded information.

Irrespective of embedding methods, each piece of embedded information is embedded using the following format, for example. FIG. 5 shows an example of a format of the embedded information.

As shown in FIG. 5, the embedding information includes header information and data. The header information is for identifying type or meaning of the embedding information. A value is predetermined for each type of embedding information. For example, 0×01 corresponds to the author ID, 0×02 corresponds the generation date and time, and 0×03 corresponds link information. In addition, data is information indicating contents of the embedded information. Therefore, for example, when the header information is 0×01, the author ID is stored in the embedded information.

Next, the determination unit 12 determines whether information is embedded in the object image. That is, the determination unit 12 determines whether digital watermark is added to the object information in step S102. Since it is generally difficult to identify digital watermark, such determination step is necessary. In this step, it is desirable to determine presence or absence of the embedded information for each of plural kinds of embedding methods such as methods of two dimensional barcode or dot pattern or the like. In this embodiment, although an example is explained in which information is embedded by digital watermarking, there may be a case where the embedding method is unknown. In such a case, by performing the determination process for each of plural embedding methods, information can be extracted more flexibly. In this case, when the embedded information is detected by any one of the methods, it is determined that information is embedded in the object image. When the embedded information is not detected by any method, it is determined that information is not embedded in the object image.

When the information is not embedded in the object image, the determination unit 12 causes the display apparatus 107 to display an error message and ends the process in step S108.

On the other hand, when the information is embedded, the information extraction unit 13 extracts embedded information (digital watermark information) from the object image in step S103. Information extracted in this step is called extraction information hereinafter. As mentioned above, there may be a case where plural kinds of pieces of information are embedded in an object image. Therefore, plural kinds of pieces of extraction information may be extracted.

Next, the function list generation unit 14 makes a list of executable functions using the extraction information in step S104. It is desirable to store a corresponding table shown in FIG. 6 in the HDD 102 beforehand so as to make the list of the executable functions based on the correspondence table.

Figure 6:
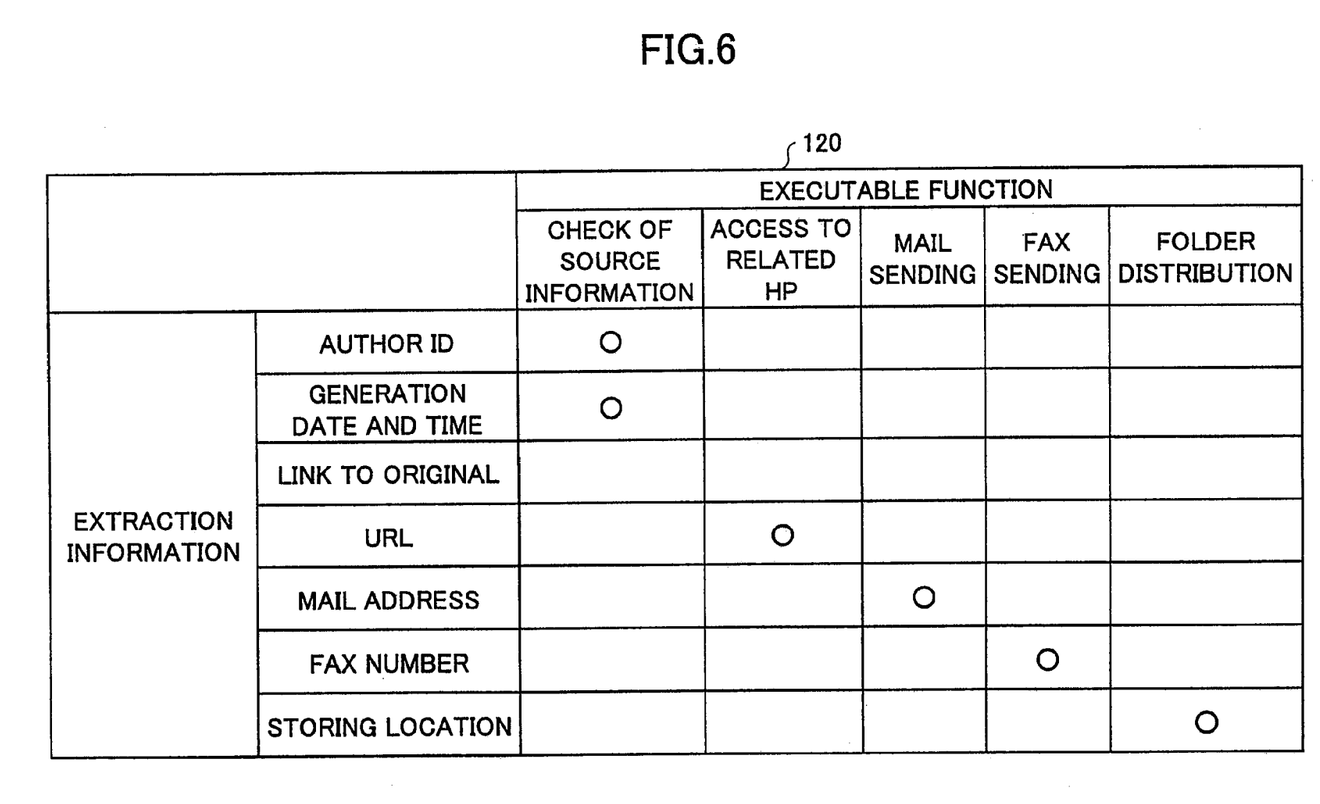
FIG. 6 shows a correspondence table between extracted information and executable functions.

FIG. 6 shows the correspondence table between extraction information and executable functions. The correspondence table 120 is configured such that one can identify each executable function corresponding to a kind of the extraction information. For example, the correspondence table 120 indicates that, when both of the author ID and the generation date and time are extracted, a function for checking source information (function for displaying source information) is executable. In the same way, when URL, mail address, FAX number or storing location is extracted, the executable function is access to a Web page (home page related to the object image) of the URL, mail sending to the mail address (send the object image, for example), FAX sending to the FAX number (send the object image by FAX, for example), or distribution to the storing location (distribute the object image to a folder corresponding to the object image).

Therefore, the function list generation unit 14 determines a kind of the extraction information based on the header information of each extraction information, so as to extract the executable function from the correspondence table 120 using the determination result. By the way, relationship of each executable function is not alternative or exclusive. When plural kinds of pieces of extraction information are extracted, plural functions may be executable.

Figure 7:
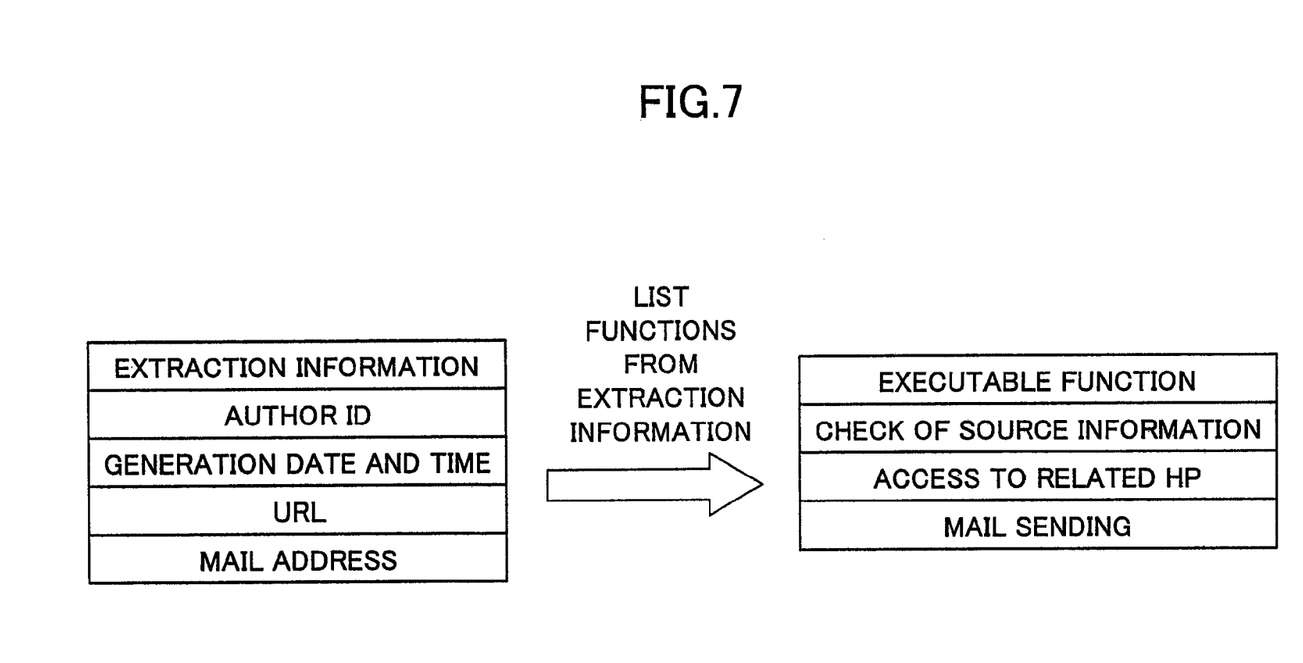
FIG. 7 shows an example of the list of the executable functions made based on the extraction information.

FIG. 7 shows an example of the list of the executable functions that is made based on the extraction information. FIG. 7 shows a case where the author ID, the generation date and time, the URL, and the mail address are extracted at the same time as the extraction information. In this case, based on the correspondence table 120 shown in FIG. 6, executable functions to be extracted are checking of source information, access to a related home page, and mail sending.

Next, the function list display unit 15 causes the display apparatus 107 to display the list of the executable functions in step S105.

Figure 8:
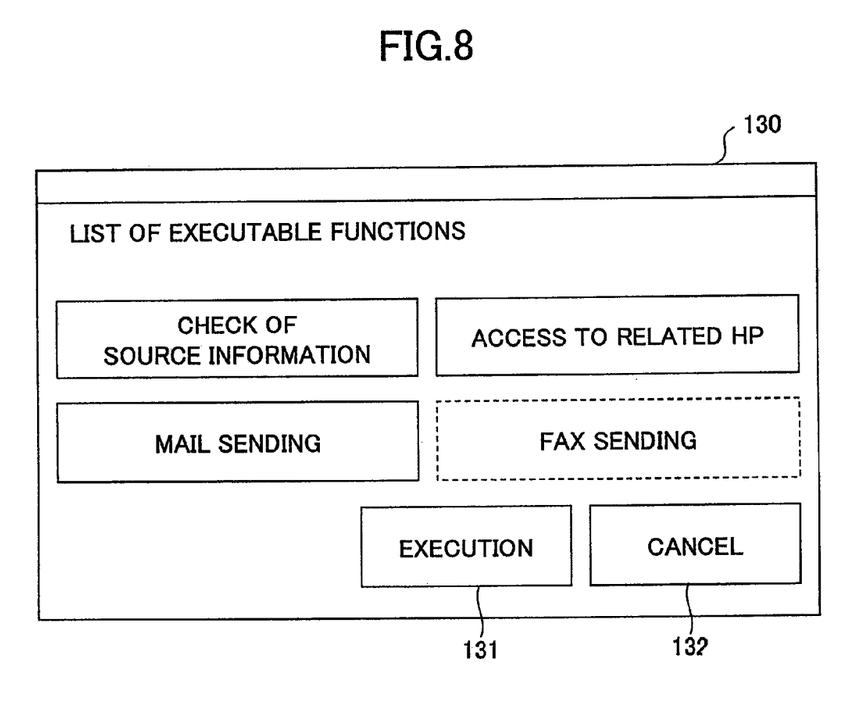
FIG. 8 shows a display example of a list of executable functions in the first embodiment.

FIG. 8 shows a display example of the list of the executable functions in the first embodiment. In FIG. 8, the list of the executable functions is displayed by a dialog (to be referred to as executable function selection dialog 130 hereinafter) for selecting a function (execution function) to be actually executed from the executable functions. The executable function selection dialog 130 displays buttons each corresponding to a function of the listed executable functions, so as to be able to select an execution function. The function list display unit 15 determines whether each function of the listed execution functions is actually usable. The function list display unit 15 grays out each button corresponding to a function determined to be unusable (FAX sending in this example) such that a user cannot use the function. Alternatively, the information processing apparatus 10 may display a list of usable functions on the executable function selection dialog 130 such that functions extracted as executable functions based on the extraction information are selectable from the list, and that other functions are grayed out to be un-selectable. By the way, in the figure, graying out of the button is represented by drawing the button using dotted lines.

Next, the function selection unit 16 receives selection result of an execution function from a user in step S106. That is the user selects a button corresponding to a function that the user wants to execute on the execution function selection dialog 130 using a mouse and the like, and clicks the execution button 131 so that the execution function is selected. By the way, plural execution functions may be selected.

When the execution button 131 is clicked, the function execution unit 17 determines whether at least one execution function is selected. When at least one execution function is selected, the function execution unit 17 executes a function selected by the user in step S107. The information processing apparatus may automatically display the execution function selection dialog 130 after executing the function such that the user can select execution functions continuously. In this case, the information processing apparatus 10 may highlight a button corresponding to already executed functions, or may display a predetermined mark such that the user can identify already executed functions and functions not yet executed. When a cancel button 132 is clicked on the execution function selection dialog 130, the function execution unit 17 ends the process without executing any function.

Next, a second embodiment is described. In the second embodiment, an example using an image processing apparatus such as a copy machine and a multifunctional machine is described. That is, an example is explained in which the image processing apparatus extracts embedded information from a printed document in which information is embedded as a tint block pattern (background pattern).

Figure 9:
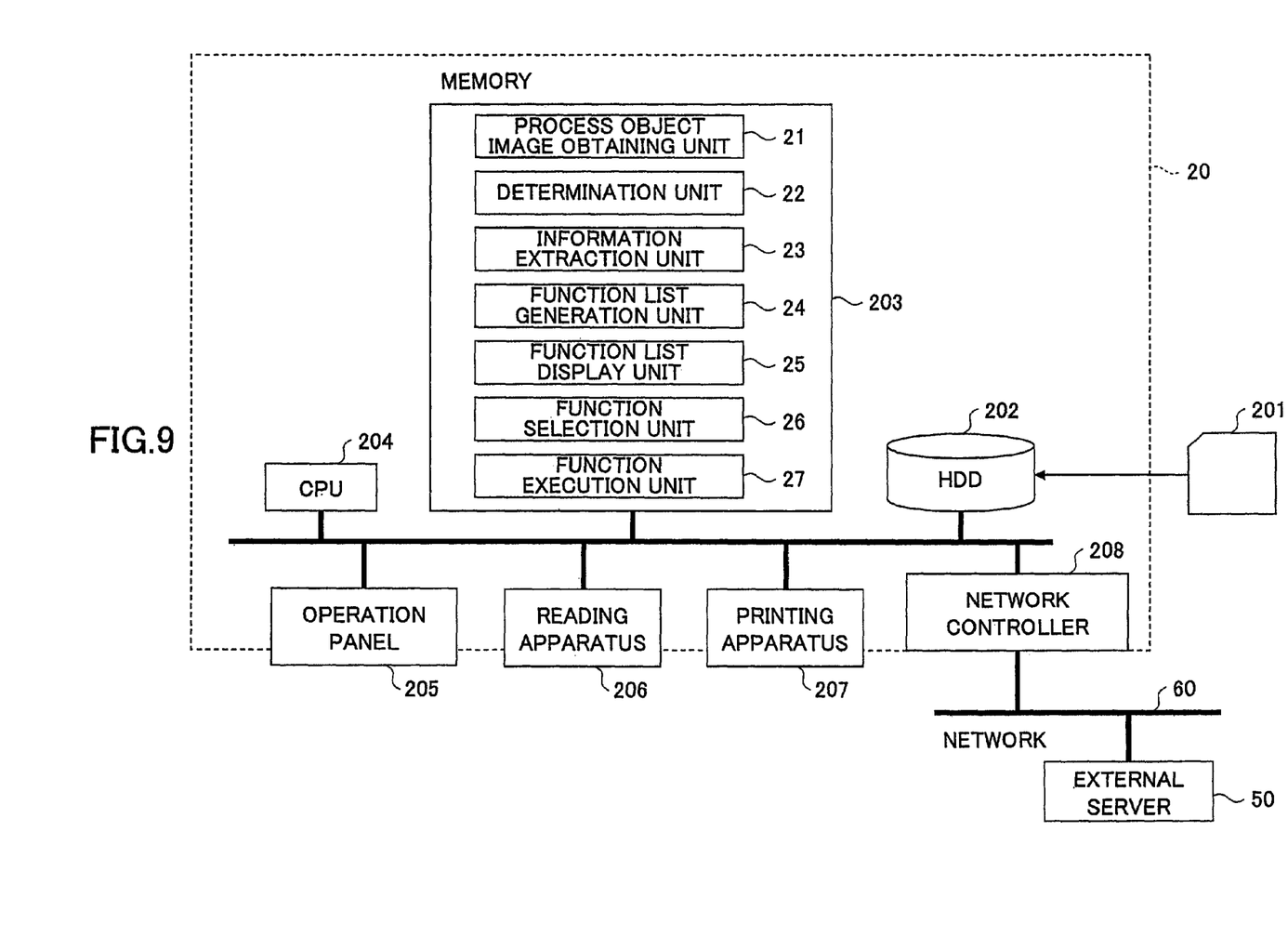
FIG. 9 shows a configuration example of a multifunctional machine in a second embodiment.

FIG. 9 shows a configuration example of the multifunctional machine in the second embodiment. In FIG. 9, same reference symbols are assigned to the same parts in FIG. 1.

In FIG. 9, the multifunctional machine 20 includes an HDD 202, a memory 203, a central processing unit 204, an operation panel 205, a reading apparatus 206, a printing apparatus 207, and a network controller 208 which are connected to each other.

A program for realizing functions of the multifunctional machine 20 is provided by a recording medium 201 such as a SD card. The program stored in the recording medium 201 is stored in the HDD 202 by installing the program. The HDD 202 stores the installed program and stores various data (image data and the like) necessary for processing the program.

When the program is instructed to launch, the program is read from the HDD 202 and is stored in the memory 203. The central processing unit 204 executes the program to realize functions of the multifunctional machine 20. The operation panel 205 receives inputs from a user and displays various information. The reading apparatus 206 scans an image printed on a printed document. The printing apparatus 207 prints image data. The network controller 208 controls network communications.

By the way, functions realized by the program include a process object image obtaining unit 21, a determination unit 22, an information extraction unit 23, a function list generation unit 24, a function list display unit 25, a function selection unit 26 and a function execution unit 27 and the like. These corresponds to the process object image obtaining unit 11, the determination unit 12, the information extraction unit 13, the function list generation unit 14, the function list display unit 15, the function selection unit 16 and the function execution unit 17 in the first embodiment.

Figure 10:
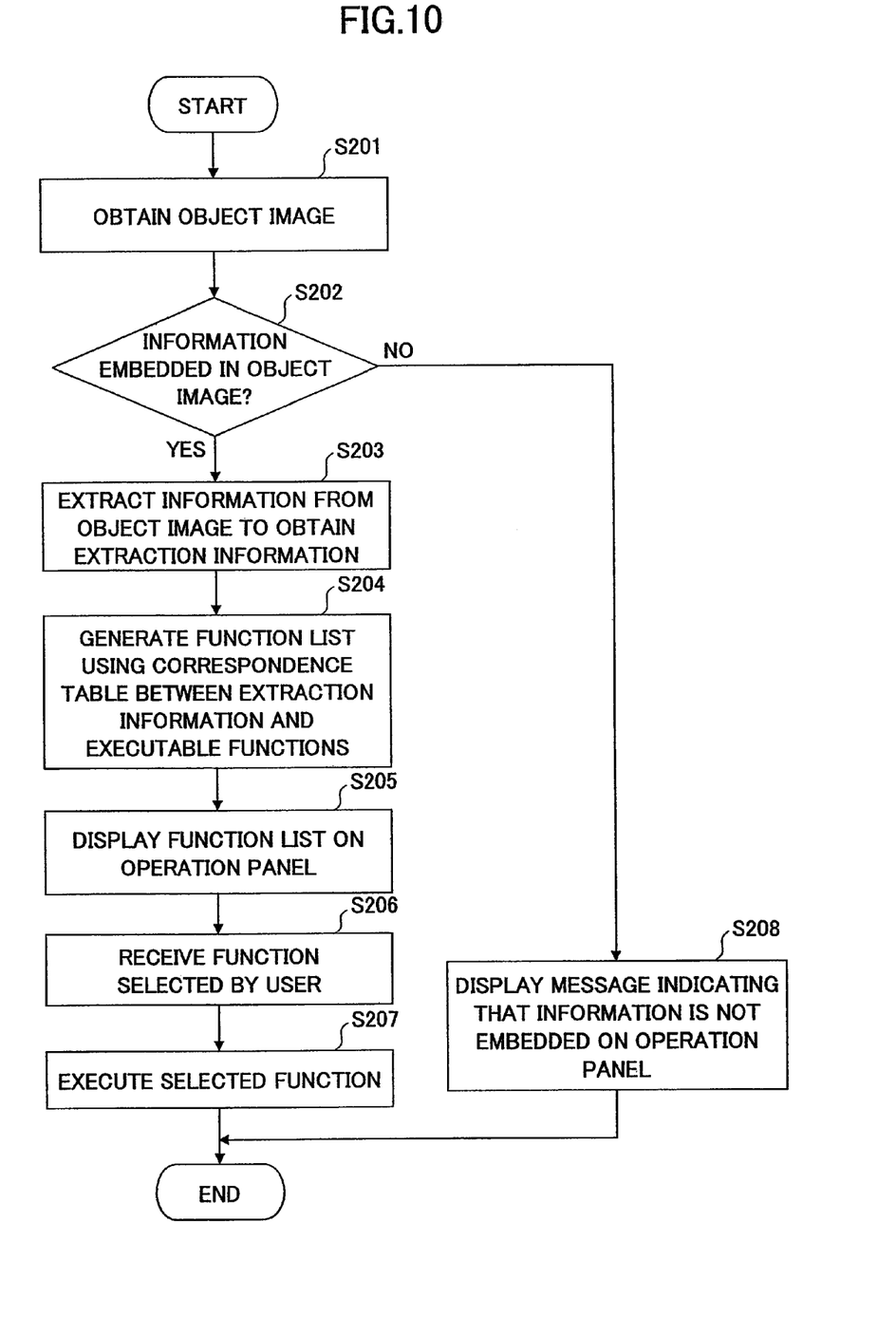
FIG. 10 is a flowchart for explaining a process procedure of the multifunctional machine in the second embodiment.

In the following, a process procedure of the multifunctional machine 20 of FIG. 9 is described. FIG. 10 is a flowchart for explaining the process procedure of the multifunctional machine 20 in the second embodiment.

In step S201, the process object image obtaining unit 21 reads the object image from the printed document according to operation by the user on the operation panel 205.

Figure 11:
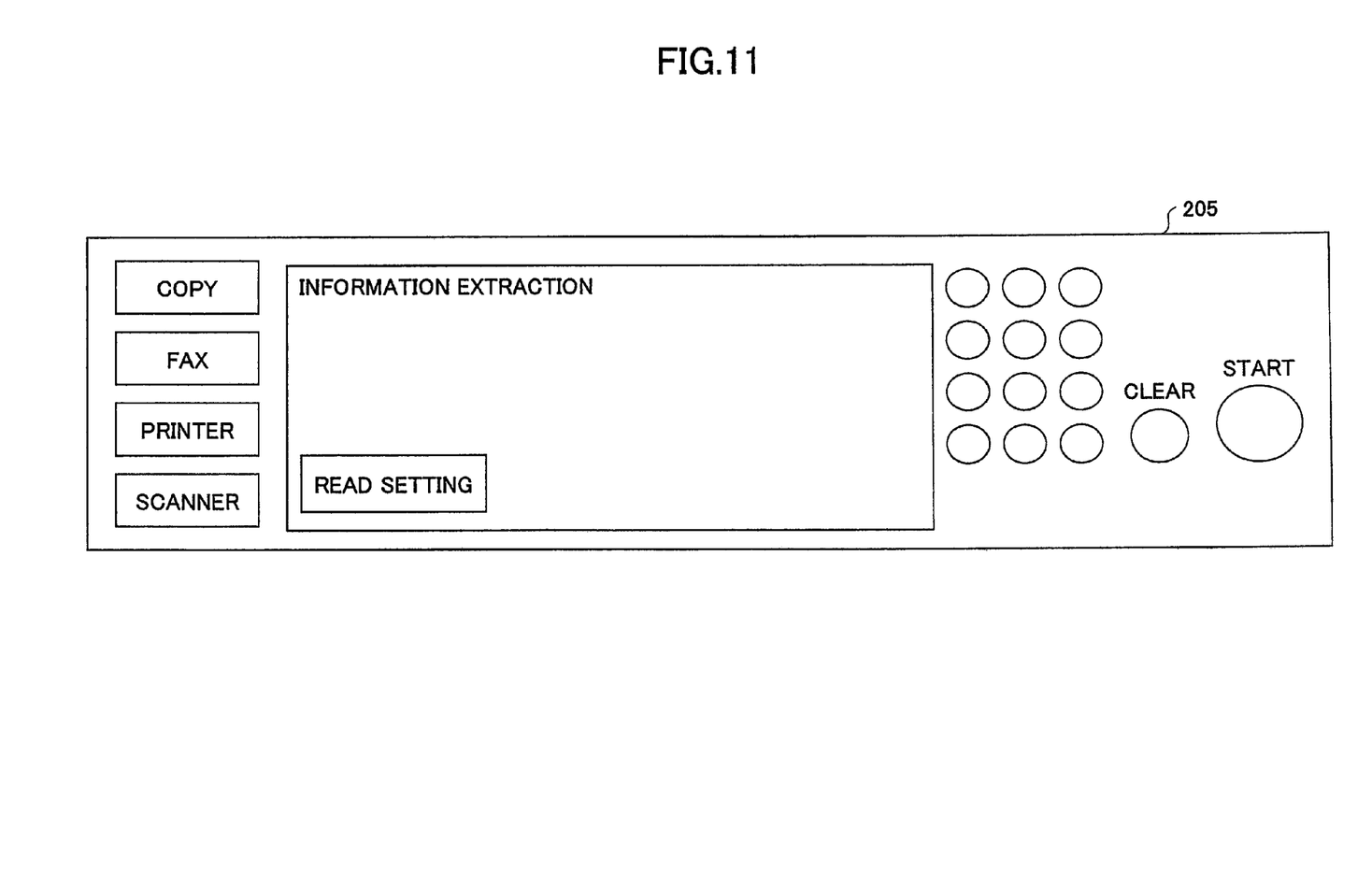
FIG. 11 shows an example of an operation panel.

FIG. 11 shows an example of the operation panel. When the user sets the printed document on the reading apparatus 206 of the multifunctional machine 20 and pushes a start button 2051 of the operation panel 205, an object image is read and is stored in the memory 203.

In the following, a case is explained in which the object image is read from a printed document in which information is embedded using a tint block pattern.

Figure 12:
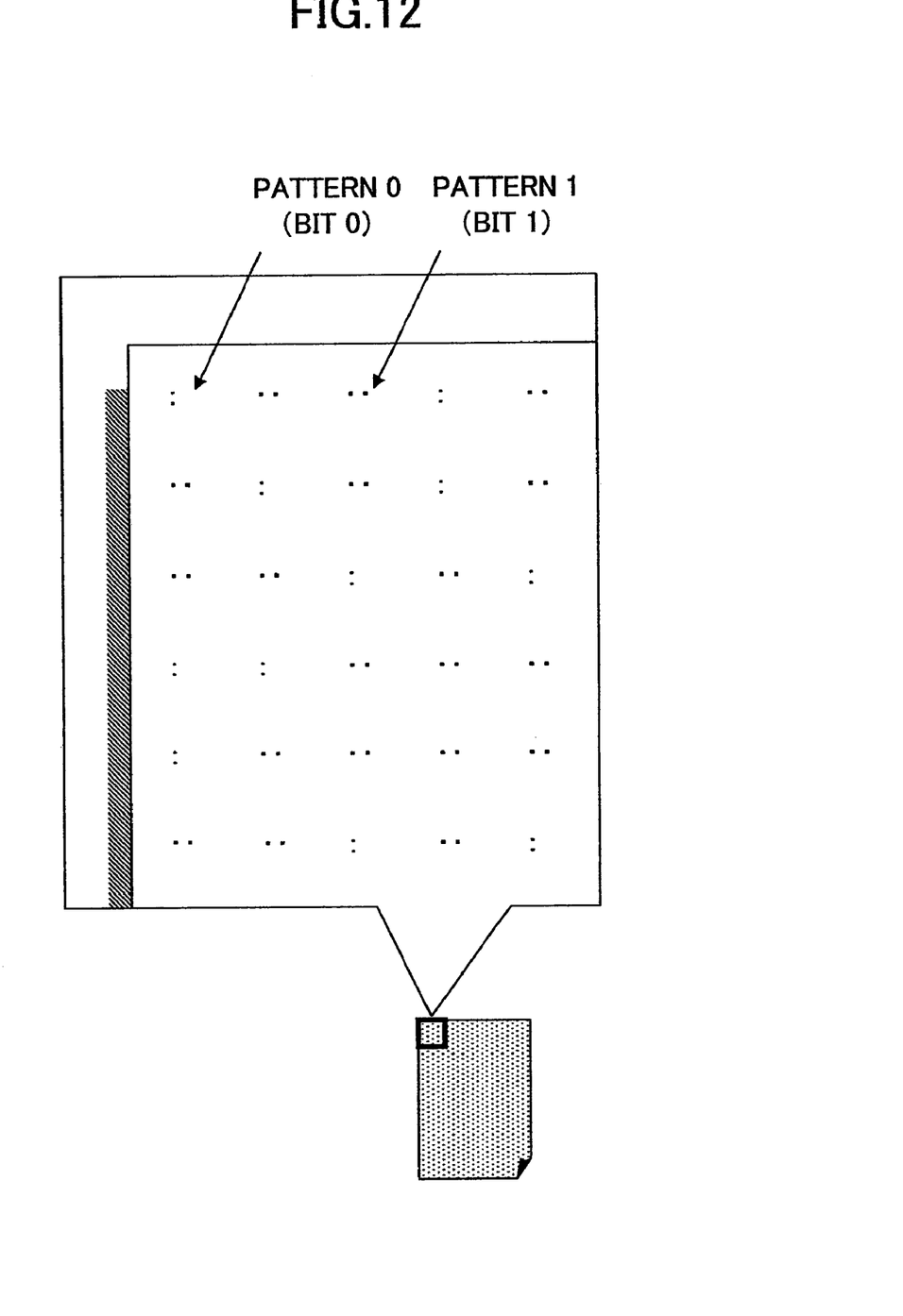
FIG. 12 shows an example of a printed document in the second embodiment.

FIG. 12 shows an example of the printed document in the second embodiment. In the example of the printed document shown in FIG. 12, information is embedded by arranging a dot pattern 0 ":" representing a bit value "0" and a dot pattern 1 "·" representing a bit value "1" like a lattice as the tint block pattern. Although the method for embedding information using a tint block pattern is not limited to any particular one, the method is described in Japanese Laid-Open Patent Application No. 2003-283797 in detail.

The embedded information in the printed document may include any one or any combination of an author ID of the object image, generation date and time of the object image, link information to original data (file) of the object image, URL to a predetermined Web page, a mail address, a FAX number, a storing location of the object image and the like. The form of the embedded information can be the same as one in the first embodiment (FIG. 5).

Next, the determination unit 22 determines whether information is embedded in the object image. That is, the determination unit 22 determines whether the dot pattern can be detected from the object information in step S202. In this step, in the same way as the first embodiment, it is desirable to determine presence or absence of the embedded information for each of plural kinds of embedding methods. In this case, when the embedded information is detected by any one of the methods, it is determined that information is embedded in the object image. When the embedded information is not detected in any method, it is determined that information is not embedded in the object image.

When the dot pattern is not detected in the object image, the determination unit 22 causes the operation panel 205 to display an error message and ends the process in step S208.

On the other hand, when the dot pattern is detected, the information extraction unit 23 extracts embedded information embedded as the dot pattern from the object image in step S203. Information extracted in this step is called extraction information hereinafter.

Next, the function list generation unit 24 makes a list of executable functions using the extraction information in step S204. The extraction of the executable functions can be performed based on the correspondence table 120 shown in FIG. 6 like the first embodiment.

Next, the function list display unit 25 causes the operation panel 205 to display a list of the executable functions in step S205.

Figure 13:
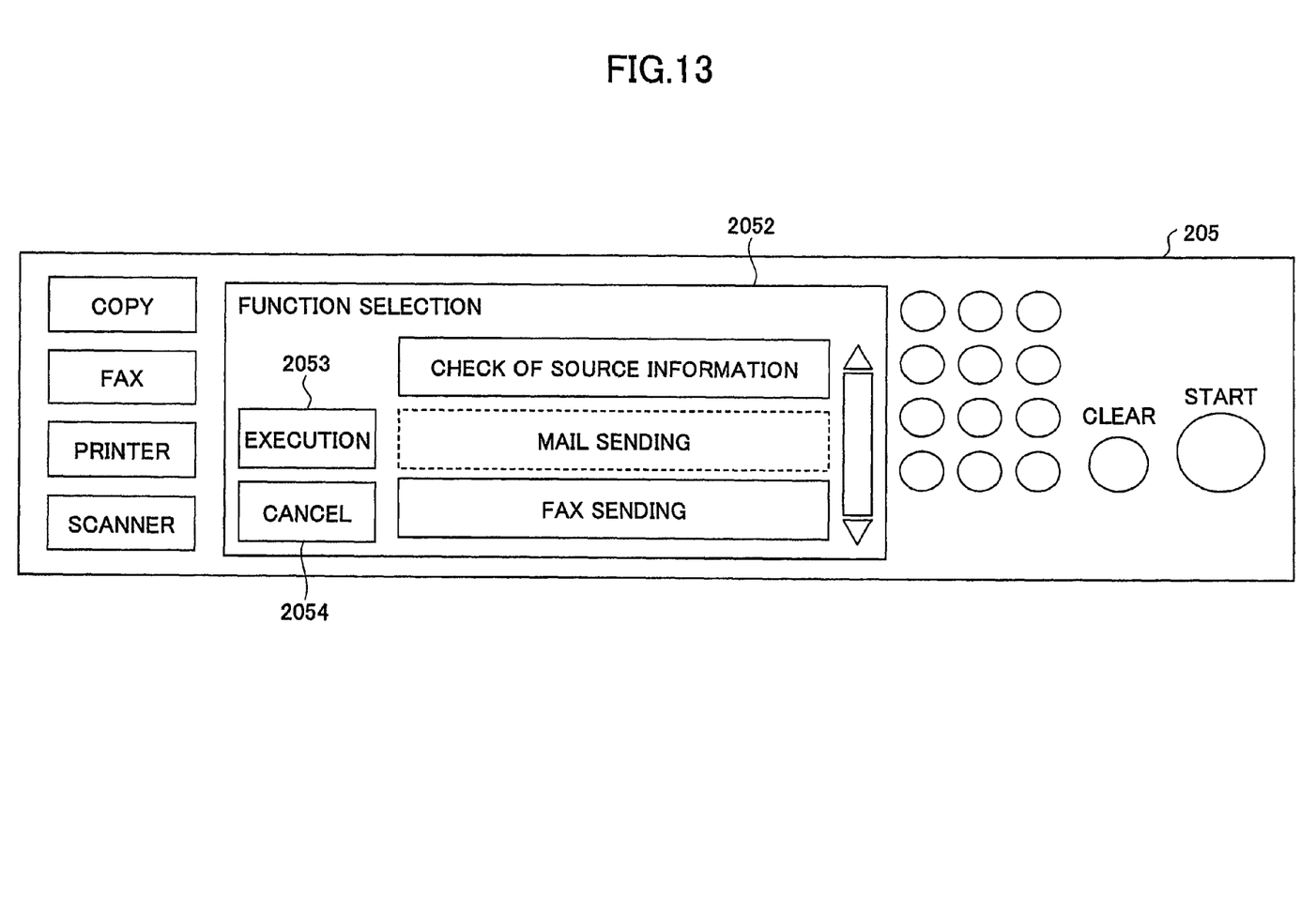
FIG. 13 shows a display example of the list of the executable functions in the second embodiment.

FIG. 13 shows a display example of the list of the executable functions in the second embodiment. The liquid crystal panel 2052 of the operation panel 205 shown in FIG. 13 displays buttons corresponding to listed functions based on the extraction information as the executable functions, such that the user can select an execution function. The function list display unit 25 determines whether each function of the listed execution functions is actually usable in the multifunctional machine 20. The function list display unit 25 grays out each button (mail sending in this example) corresponding to a function determined to be unusable such that the user cannot use the function. Alternatively, the multifunctional machine 20 may display a list of usable functions on the liquid crystal panel 2052 such that functions extracted as executable functions based on the extraction information are selectable from the list, and that other functions are grayed out to be unselectable. By the way, in the figure, graying out of the button is represented by drawing the button using dotted lines.

Next, the function selection unit 26 receives selection of an execution function from the user in step S206. That is, the user selects a button corresponding to a function that the user wants to execute on the operation panel 205 and clicks the execution button 2053 so that the execution function is selected. By the way, plural execution functions may be selected.

When the execution button 2053 is pushed down, the function execution unit 27 determines whether at least one execution function is selected in step S207. When at least one execution function is selected, the function execution unit 27 executes the function selected by the user in step S207. The multifunctional machine 20 may automatically display the list of the executable functions after executing the function such that the user can select execution functions continuously. In this case, the multifunctional machine 20 may highlight the button corresponding to already executed function, or may display a predetermined mark such that the user can identify already executed functions and functions not yet executed. When a cancel button 2054 is pushed down on, the function execution unit 27 ends the process without executing any function.

The first and second embodiments can be applied to an image or printed material in which information is embedded by barcode.

As mentioned above, according to the information processing apparatus 10 or the multifunctional machine 20 of the embodiments of the present invention, embedded information can be extracted from an image or printed material, and a list showing executable functions can be provided based on the embedded information, wherein information is embedded in the image or the printed material as a form such as digital watermark, barcode, or the tint block pattern and the like for which it is difficult for a human to identify. Therefore, the user can easily identify executable functions or services for the image or the printed material, and the user can execute the functions easily. In addition, for providing a new function or service to the embedded information, it is not necessary to change the form of the embedded information. Since it is only necessary to change the extraction side (information processing apparatus 10 or the multifunctional machine 20) of the information for adding the new function or service, extension of the function and the service can be easily performed.

By the way, the correspondence table 120 may be shared between the information extraction side and the information embedding side such that a function expected to be realized when the information is embedded can be actually executed when the information is extracted. In this case, the correspondence table 120 may be included in each apparatus, or the correspondence table 120 may be stored in a shared storage that can be referred to from each apparatus. The latter method is desirable in view of easiness of maintenance work.

The present invention is not limited to the specifically disclosed embodiments, and variations and modifications may be made without departing from the scope of the present invention.

The present application contains subject matter related to Japanese patent application No. 2005-336873, filed in the JPO on Nov. 22, 2005, and Japanese patent application No. 2006-167993, filed in the JPO on Jun. 16, 2006, the entire contents of which are incorporated herein by reference.

What is claimed is:

1. An image processing apparatus for extracting embedded information that is embedded in an image, comprising:
a central processing unit;
an information extraction unit configured to extract the embedded information from the image;
a non-transitory computer readable medium storing a correspondence table for determining one or more executable functions according to a type of the embedded information, wherein the correspondence table includes a plurality of executable functions and a plurality of types of embedded information;
an executable function determination unit configured to determine the one or more executable functions according to the embedded information that is extracted by referring to the correspondence table to generate a list of the one or more executable functions; and
a display unit configured to display the list of the one or more executable functions determined by the executable function determination unit, said display unit having one or more buttons corresponding to the one or more executable functions for a user to select at least one of the one or more executable functions, wherein the plurality of types of embedded information included in the correspondence table comprises author identification information and time of generation information.

2. The image processing apparatus as claimed in claim 1, wherein the executable functions each correspond to a type of the embedded information.

3. The image processing apparatus as claimed in claim 2, wherein the embedded information includes at least type identification information for identifying the type of the embedded information and data.

4. The image processing apparatus as claimed in claim 3, wherein the executable function determination unit determines a type of the embedded information based on the type identification information so as to determine the executable function according to the type.

5. The image processing apparatus as claimed in claim 1, the image processing apparatus further comprising a function execution unit configured to execute a function selected from the list of the one or more executable functions displayed by the display unit.

6. The image processing apparatus as claimed in claim 1, wherein at least one of the plurality of executable functions is available to a user only when at least two types of embedded information are present in the embedded information from the image.

7. An image processing method in an image processing apparatus for extracting embedded information that is embedded in an image, comprising:
   executing an information extraction step of extracting the embedded information from the image using a central processing unit;
   executing an executable function determination step of determining one or more executable functions according to the embedded information that is extracted using the central processing unit by referring to a correspondence table defining executable functions corresponding to the embedded information to generate a list of the one or more executable functions, wherein the correspondence table includes a plurality of executable functions and a plurality of types of embedded information; and
   executing a displaying step of displaying the list of the one or more executable functions determined in the executable function determination step using the central processing unit, and further displaying one or more buttons corresponding to the one or more executable functions for a user to select at least one of the one or more executable functions,
   wherein the plurality of types of embedded information included in the correspondence table comprises author identification information and time of generation information.

8. The image processing method as claimed in claim 7, wherein the executable functions each correspond to a type of the embedded information.

9. The image processing method as claimed in claim 8, wherein the embedded information includes at least type identification information for identifying the type of the embedded information and data.

10. The image processing method as claimed in claim 9, wherein, in the executable function determination step, the image processing apparatus determines a type of the embedded information based on the type identification information so as to determine the executable function according to the type.

11. The image processing method as claimed in claim 7, the image processing method further comprising an function execution step of executing a function selected from the list of the one or more executable functions displayed in the display step.

12. A non-transitory computer readable recording medium storing an image processing program for causing a computer to extract embedded information that is embedded in an image, comprising:
   information extraction program code means for extracting the embedded information from the image;
   executable function determination program code means for determining one or more executable functions according to the embedded information that is extracted by referring to a correspondence table defining executable functions corresponding to the embedded information to generate a list of the one or more executable functions, wherein the correspondence table includes a plurality of executable functions and a plurality of types of embedded information; and
   display program code means for displaying the list of the one or more executable functions determined by the executable function determination program code means, and for displaying one or more buttons corresponding to the one or more executable functions for a user to select at least one of the one or more executable functions,
   wherein the plurality of types of embedded information included in the correspondence table comprises author identification information and time of generation information.

13. The non-transitory computer readable recording medium as claimed in claim 12, wherein the correspondence table includes executable functions each corresponding to a type of the embedded information.

14. The non-transitory computer readable recording medium as claimed in claim 13, wherein the embedded information includes at least type identification information for identifying the type of the embedded information and data.

15. The non-transitory computer readable recording medium as claimed in claim 14, wherein the executable function determination program code means determines a type of the embedded information based on the type identification information so as to determine the executable function according to the type.

16. The non-transitory computer readable recording medium as claimed in claim 12, the image processing program further comprising function execution program code means for executing a function selected from the list of the one or more executable functions displayed by the display program code means.

17. The non-transitory computer readable recording medium as claimed in claim 12, wherein the embedded information is embedded in the image as digital watermark, barcode or tint block pattern.

* * * * *